United States Patent [19]

Hamajima

[11] Patent Number: 5,486,573

[45] Date of Patent: Jan. 23, 1996

[54] POLYMER POWDER CROSS-LINKED BY METALLIC IONS AND CONTAINING REINFORCING MATERIAL, PROCESS FOR PRODUCING THE POLYMER POWDER, COMPOSITE MATERIAL BASED ON POLYMER CROSS-LINKED BY METALLIC IONS, AND PROCESS FOR PRODUCING THE COMPOSITE MATERIAL

[75] Inventor: Kaneo Hamajima, Susono, Japan

[73] Assignee: Toyota Jidosha Kabushiki Kaisha, Japan

[21] Appl. No.: 82,968

[22] Filed: Jun. 29, 1993

[30] Foreign Application Priority Data

Jun. 30, 1992 [JP] Japan .................................. 4-172474
Aug. 6, 1992 [JP] Japan .................................. 4-210527
Jan. 18, 1993 [JP] Japan .................................. 5-005687

[51] Int. Cl.$^6$ .................................................. C08F 275/00
[52] U.S. Cl. ........................ 525/274; 525/330.2; 525/373; 524/413; 524/440; 524/492; 524/493; 524/496
[58] Field of Search ........................ 524/440, 413, 524/492, 493, 495, 496; 525/274, 330.2, 373

[56] References Cited

U.S. PATENT DOCUMENTS

| | | | |
|---|---|---|---|
| 2,961,364 | 11/1960 | Smith et al. ............. | 154/128 |
| 3,580,882 | 5/1971 | Nielson et al. ........... | 260/41 |
| 3,652,491 | 3/1972 | Nielsen et al. ........... | 260/41 |

FOREIGN PATENT DOCUMENTS

| | | |
|---|---|---|
| 0349828 | 1/1990 | European Pat. Off. . |
| 2229721 | 12/1974 | France . |
| 2251611 | 6/1975 | France . |
| 2457892 | 6/1975 | Germany . |
| 62-74905 | 4/1987 | Japan . |
| 62-74906 | 4/1987 | Japan . |
| 62-259818 | 11/1987 | Japan . |

OTHER PUBLICATIONS

European Search Report dated Dec. 20, 1993.
Communication dated Jan. 5, 1994.

*Primary Examiner*—Edward Cain
*Attorney, Agent, or Firm*—Finnegan, Henderson, Farabow, Garrett & Dunner

[57] ABSTRACT

Disclosed is a polymer powder cross-linked by metallic ions and containing reinforcing material which includes a polymer cross-linked by metallic ions, and at least one reinforcing material selected from the group consisting of a fibrous reinforcing material and a particulate reinforcing material and contained uniformly in the polymer cross-linked by metallic ions in an amount of from 3 to 70% by volume. The polymer powder can be processed into a composite material based on the polymer. The composite material is improved in the strength and the impact resistance while maintaining the superb physical properties of the polymer, because the reinforcing material is dispersed too uniformly to be localized therein. Additionally, processes are disclosed which are suitably adapted to produce the polymer powder and the composite material.

5 Claims, 7 Drawing Sheets

(NOTE)
*1 Si₃N₄ WHISKER, 25% BY VOLUME
*2 Si₃N₄ WHISKER, 40% BY VOLUME
*3 SiC WHISKER, 25% BY VOLUME
*4 ALUMINUM BORATE WHISKER, 30% BY VOLUME
*5 POTASSIUM TITANATE WHISKER, 40% BY VOLUME

Fig. 8

□ PREF. EMBODIMENTS, RUPTURE DEFLECTION
○ PREF. EMBODIMENTS, FLEXURAL STRENGTH
■ COMP. EX., RUPTURE DEFLECTION
● COMP. EX., FLEXURAL STRENGTH

Fig. 9

POLYMER POWDER CROSS-LINKED BY METALLIC IONS AND CONTAINING REINFORCING MATERIAL, PROCESS FOR PRODUCING THE POLYMER POWDER, COMPOSITE MATERIAL BASED ON POLYMER CROSS-LINKED BY METALLIC IONS, AND PROCESS FOR PRODUCING THE COMPOSITE MATERIAL

BACKGROUND OF THE INVENTION

1. Field of the Invention

The present invention relates to a polymer powder comprising a polymer cross-linked by metallic ions, such as a metallic salt of polyacrylic acid, or the like, and a composite material or a reinforcing material. The present invention also relates to a composite material based on the polymer cross-linked by metallic ions, and processes for producing the polymer powder and the composite material.

2. Description of the Related Art

There is a polymer, such as the metallic salt of polyacrylic acid cross-linked by metallic ions, or the like, which is cross-linked by metallic ions with a high density. This polymer is growingly expected to substitute for metals, because it exhibits a high heat resistance, isotropy and modulus of elasticity.

As set forth in Japanese Unexamined Patent Publication (KOKAI) Nos. 62-74,905, 62-74,906 and 62-259,818, the polymers cross-linked by metallic ions are produced by reacting polyacrylic acids and inorganic metallic ions in predetermined ratios in aqueous solutions including hydroxides of alkaline metals. The polymers are deposited as precipitates, and the precipitates are dried to make polymer powders.

No ordinary resin molding processes can be applied to the polymer powders comprising the polymers cross-linked by metallic ions, because they are thermally infusible. Hence, they are usually processed into molded bodies by heating, compressing and molding at a high pressure of several thousands kgf/cm$^2$ or more.

The molded bodies made from the polymer powders cross-linked by metallic ions exhibit physical properties equivalent to metals, e.g., the heat resistance and the modulus of elasticity equivalent thereto. However, they suffer from disadvantages in that they exhibit such a low elongation, impact resistance and strength that they are hindered from the structural material applications.

In order to compensate the insufficient physical properties, it is possible to think of mixing a reinforcing material like fiber, etc., with the polymer powders. Such a reinforcing material mixing has been utilized for the general polymer materials. In the general polymer materials, even if the reinforcing materials are dispersed so unfavorably that they are localized in the general polymer materials, the composite materials made from the general polymer materials scarcely exhibit a sharply deteriorated strength. This results from the fact that the general polymer materials can be melted during the molding, and accordingly they can be impregnated into spaces between the reinforcing materials.

On the other hand, since the polymer powders cross-linked by metallic ions are thermally infusible as aforementioned, it is impossible to employ the conventional process in which the reinforcing materials are mixed with the molten polymer materials. Accordingly, it is only possible to mix the polymer powders cross-linked by metallic ions and the reinforcing materials in their solid forms. However, even if the polymer powders and the reinforcing materials are dispersed and mixed by using a ball mill, or the like, it is hard to mix them uniformly because they differ in their shapes. In addition, since the polymer powders cross-linked by metallic ions little exhibit a flowability during the molding, the localized reinforcing materials in the polymer powders are kept as they are even in the composite materials, and thereby they adversely affect the physical properties of the composite material considerably. As a result, the more the reinforcing materials are added, the lower the strength of the composite materials degrades. Thus, it is hardly expected to effect the improvements on the physical properties.

SUMMARY OF THE INVENTION

The present invention has been developed in view of the aforementioned circumstances. It is a primary object of the present invention to provide a polymer powder cross-linked by metallic ions and containing reinforcing material, or a composite material based thereon, in which the reinforcing material is dispersed uniformly. It is a secondary object of the present invention to provide a process for producing the polymer powder or the composite material which enables the polymer powder to uniformly contain the reinforcing powder, thereby remarkably improving the physical properties of the polymer powder or the composite material.

The primary object can be carried out by a polymer powder cross-linked by metallic ions and containing reinforcing material according to the present invention, the polymer comprising:

a polymer cross-linked by metallic ions; and at least one reinforcing material selected from the group consisting of a fibrous reinforcing material and a particulate reinforcing material and contained uniformly in the polymer cross-linked by metallic ions in an amount of from 3 to 70% by volume.

The primary object can be carried out also by a composite material based on a polymer cross-linked by metallic ions according to the present invention, the composite material comprising:

a matrix including a polymer cross-linked by metallic ions;

at least one reinforcing material selected from the group consisting of a fibrous reinforcing material and a particulate reinforcing material and dispersed uniformly in the matrix in an amount of from 5 to 70% by volume.

The polymer cross-linked by metallic ions constituting the polymer powder or the matrix of the composite material can be a polymer which is formed by mixing a polymer raw material, reactable and cross-linkable by metallic ions, and an aqueous solution including hydroxide of alkaline metals or alkali earth metals dissolved therein.

Regarding the material quality of the reinforcing material, the reinforcing material is not limited as far as it is so stable that it scarcely decomposes or degrades in the solvents used during the synthesis. Regarding the configuration, the reinforcing material gives the reinforcing effect most when it is formed in a configuration of fine whisker. When such is the case, it is possible to achieve a uniform compounding, and such a uniform compounding results in highly favorable physical properties. Other than the fine whisker, the reinforcing material can be chopped fiber, milled fiber, or the like, or it can be formed in particles. When such is the case, it is also possible to achieve a uniform compounding, and such a reinforcing material also reinforces the polymer effectively. However, since the polymer and the reinforcing material are processed at a high temperature, the reinforcing material is required to exhibits a heat resistance against temperatures of 200° C. or more. Since the reinforcing material is required to uniformly disperse in the polymer powder or the composite material, it is preferred that the reinforcing material has a length of 3 mm or less, further preferably, 1 mm or less.

The fibrous reinforcing material can be organic fiber having a length of 3 mm or less. The organic fiber can be chopped fiber, milled fiber, or the like. When the organic fiber has a length of more than 3 mm, it is likely to disperse unevenly. Accordingly, the formability degrades, and the composite material or s molded body comes to have impaired appearances. In particular, it is most preferable to use milled fiber having a length of 1 mm or less. The organic fiber can be aramid fiber, aromatic polyester fiber, polyethylene fiber, nylon fiber, or the like. However, in view of the possibility of forming the composite material at a high temperature and the requirement of maintaining the heat resistance, one of the characteristics of the polymer powder, it is preferable to use para-aramid fiber, meta-aramid fiber, whole aromatic polyester fiber, or the like, because the fibers are stable at temperatures of 200° C. or more and because they highly strengthen the resulting composite material.

In the case of the polymer powder cross-linked by metallic ions, the reinforcing material is contained in the polymer powder in an amount of from 3 to 70% by volume. When the content is less than 3% by volume, no effects resulting from the addition of the reinforcing material can be obtained. The reinforcing material is hardly contained in the polymer in an amount of more than 70% by volume by a process for producing the polymer powder according to the present invention.

In the case of the composite material, the reinforcing material is contained in the matrix in an amount of from 5 to 70% by volume. When the content is less than 5% by volume, no effects resulting from the addition of the reinforcing material can be obtained. It is hard to produce the composite material which contains the reinforcing material in an amount of more than 70% by volume. Further, when the content is more than 70% by volume, the reinforcing materials are contacted with each other with a high probability in the resulting composite material or the molded body, and accordingly there might arise a fear that the strength degrades and the heat resistance deteriorates in the resulting composite material.

In addition, when the reinforcing material is made from inorganic material, it is further preferred that the content falls in a range of from 10 to 50% by volume. When the reinforcing material is made from organic material, it is further preferred that the content falls in a range of from 10 to 60% by volume.

As a raw material for the polymer cross-linked by metallic ions, polyacrylic acid can be used representatively. The polyacrylic acid can be produced by copolymerizing acrylic acid in an amount of from 80 to 100% by mole and the other vinyl monomer in an amount of from 0 to 20% by mole. Regarding the degree of polymerization, the polyacrylic acid has a number average molecular weight of from 50 to 1,250,000, preferably 100 or more. Other than the polyacrylic acid, a polymer which can be dissolved into the solvent through dissociation and which can be reacted with the metallic ions can be used as the raw material. Such a polymer can be, for example, polymethacrylic acid, polystyrene carboxylic acid, polystylene sulfonic acid, or the like.

The metallic ions cross-linking the polymer raw material can be derived from metallic salts including monovalent metallic ions such as $Na^+$, $K^+$, $Li^+$, and the like, divalent metallic ions such as $Zn^{2+}$, $Mg^{2+}$, $Ca^{2+}$, $Sn^{2+}$, $Fe^{2+}$, $Pb^{2+}$, $Cu^{2+}$, $Co^{2+}$, $Ni^{2+}$, and the like, trivalent metallic ions such as $Mn^{3+}$, $Cr^{3+}$, $Al^{3+}$, $La^{3+}$, $Ru^{3+}$, and the like, or tetravalent metallic ions such as $Ti^{4+}$, $Zr^{4+}$, $Te^{4+}$, and the like.

Regarding the mixing ratio of the metallic ions with respect to the polymer raw material, from 0.1 to 20 equivalents of the metallic ions can be mixed with respect to 1 equivalent of the carboxylic groups of the polymer raw material.

The secondary object can be carried out by a process for producing a polymer powder cross-linked by metallic ions and containing reinforcing material according to the present invention, the process comprising the steps of:

a reinforcing material dispersion step of preparing a solution including a polymer raw material cross-linkable by reacting with metallic ions and another solution including the metallic ions, and dispersing a fibrous reinforcing material or a particulate reinforcing material in at least one of the solutions;

a reaction step of mixing the solutions to react, thereby preparing precipitates including a polymer which is cross-linked by the metallic ions and captures the reinforcing material; and a separation and desiccation step of separating the precipitates from liquid and drying them.

The secondary object can be carried out also by a process for producing a composite material based on a polymer cross-linked by metallic ions according to the present invention, the process further comprising a formation step of heating, compressing and molding the polymer powder with a mold in addition to the steps of the process for producing the polymer powder.

In the reaction step, the polymer cross-linked by the metallic ions is precipitated while it captures the reinforcing material. The reaction step can be carried out by first dispersing the reinforcing material in the solution including the polymer raw material dissolved therein, and then by mixing the solution including the metallic ions, thereby reacting the solutions. Also, it can be carried out by first dispersing the reinforcing material in the solution including the metallic ions, and then by mixing the solution including the polymer raw material dissolved therein, thereby reacting the solutions. Namely, as far as the solution including the polymer raw material dissolved therein and the solution including the metallic ions are prepared independently, the reinforcing material can be included in either of the solutions. Naturally, the reinforcing material can be dispersed in both of the solutions.

The reaction step, in which the polymer cross-linked by the metallic ions is precipitated while it captures the reinforcing material, can be carried out with ease in the case that the polymer cross-linked by the metallic ions is separated from the solvent to precipitate. When the metallic ions are the monovalent ions, the polymer is less likely to precipitate. If such is the case, the polymer can be precipitated by heating the mixed solution. Thus, the solvent is evaporated and the solution is condensed, thereby precipitating the polymer. However, it is preferred to carry out the former reaction step, because the former reaction step, employing the metallic ions and the polymer raw material which can be separated from the solvent to produce the precipitates, enables to attain the uniform dispersion of the reinforcing material more favorably than the latter reaction step does, and because the former reaction step can produce the precipitates easier than the latter reaction step does.

The precipitates are separated from the solvent, washed and dried, and they are pulverized, if necessary, and thereby they are made into the present polymer powder cross-linked by the metallic ions and containing the reinforcing material. The polymer powder itself can be charged into a mold, and it can be formed into a composite material which exhibits good physical properties, e.g., the heat resistance, the modulus of elasticity, the impact resistance, the strength, etc., by heating and compressing. Of course, it is preferable to mix and use the present polymer powder with resins, rubbers, metals, or the like.

Figure 1:
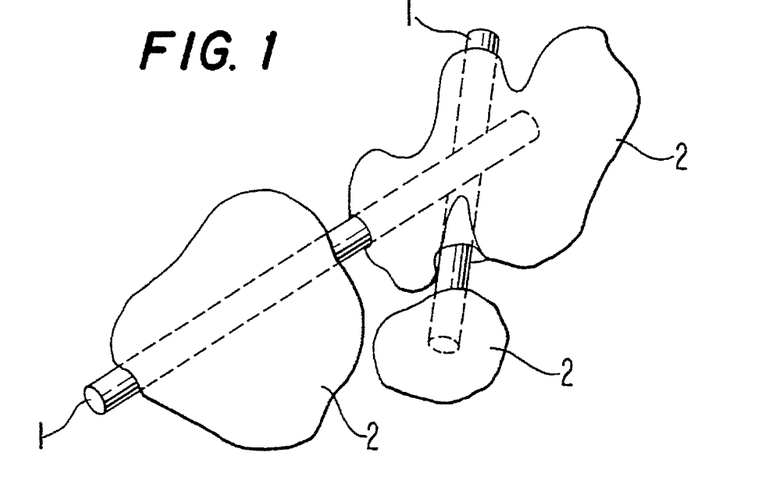
FIG. 1 is a schematic perspective view of an example of the present polymer powder.

In accordance with the present processes for producing the present polymer powder and the present composite material, the polymer cross-linked by the metallic ions is precipitated out of the solution in which the reinforcing material is dispersed. During the precipitation, the polymers cross-linked by the metallic ions capture the reinforcing materials dispersed in the solution. Accordingly, as illustrated in FIG. 1, the reinforcing materials 1 get entangled in the polymers 2 cross-linked by the metallic ions in the present polymer powder thus precipitated. With this construction, the reinforcing materials can be contained uniformly in the present polymer powder, and they are hardly localized therein. As a result, the present composite material formed by heating and compressing the present polymer powder can exhibit good physical properties such as the heat resistance, the modulus of elasticity, the impact resistance, the strength, and the like.

As having been described so far, since the present polymer powder cross-linked by the metallic ions comprises the reinforcing material which is contained satisfactorily uniformly therein, it is possible to form a composite material which is excellent in the physical properties, e.g., the heat resistance, the modulus of elasticity, the impact resistance, the strength, and the like, with the present polymer powder. When the present polymer powder is mixed and used with the other resins, metals, or the like, the resulting composite materials can be reformed in the physical properties.

Further, since the present composite material has the arrangement as recited in the accompanying claims, it exhibits a high flexibility and flexural strength, and at the same time it has a small specific gravity. Thus, the present composite material has overcome the disadvantages, e.g., the low elongation, impact resistance and strength, of the conventional polymer cross-linked by metallic ions which exhibits the heat resistance and the modulus of elasticity equal to those physical properties of metal instead. In addition, the present composite material has been light-weighted. Hence, the present composite material is expected to be applied to various structural materials.

Furthermore, in accordance with the present processes for producing the present polymer powder and the present composite material, it is possible to easily and stably produce the present polymer powder and the present composite material in which the reinforcing material is contained satisfactorily uniformly.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment 1,700 c.c. of an aqueous solution including polyacrylic acid was prepared, and it included polyacrylic acid having a number average molecular weight of 250,000 in an amount of 15.7 grams. 550 c.c. of another aqueous solution including NaOH was prepared, and it included NaOH in an amount of 10 grams. Then, the aqueous solutions were charged into a beaker made from polyethylene, and chopped carbon fiber was charged into the mixed solution in an amount of 5 grams while stirring the mixed solution. The stirring operation was continued until the chopped carbon fiber was fully opened and dispersed in the mixed solution, thereby obtaining a dispersion. The chopped carbon fiber was "TORAYCA T-B00" made by TORAY Co., Ltd., and it had a diameter of 7 micrometers, an average length of 1 mm and a specific gravity of 1.76.

Figure 2:
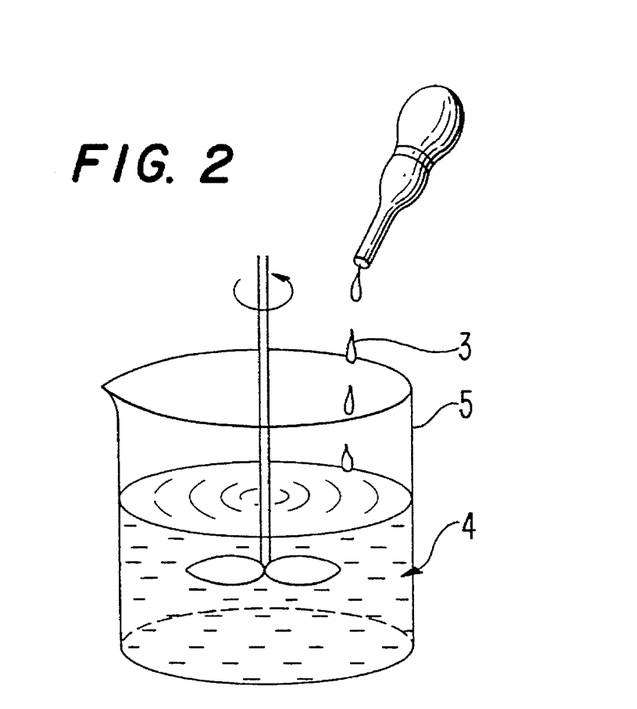
FIG. 2 is an explanatory view for illustrating the dripping of the solution including the metallic salt which contains the metallic ions into the solution including the polymer raw material.
Figure 3:
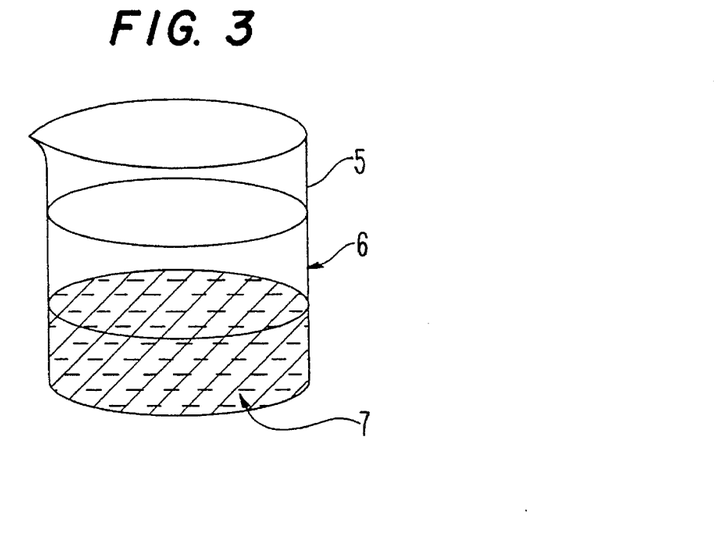
FIG. 3 is an explanatory view for illustrating the state in which the present polymer powder is separated from the solvent to precipitate.

Thereafter, 1,300 c.c. of an aqueous solution 3 including $ZnCl_2$ in an amount of 45 grams was dripped gradually into the dispersion 4 while keeping the stirring operation as illustrated in FIG. 2. Thus, the polyacrylic acid was reacted with $ZnCl_2$. Even after the whole $ZnCl_2$ aqueous solution was dripped, the stirring operation was kept for about another 10 minutes to complete the reaction. With the extra stirring operation, the reaction products were precipitated while they were capturing the chopped carbon fiber. When the stirring was terminated, the precipitates 7 were produced in the beaker 5 at the lower portion, and the supernatant liquid 6 was colorless and transparent as illustrated in FIG. 3.

The precipitates were filtered and dried. Then, the precipitates were further filtered with pure water repeatedly, and thereby they were fully washed. The precipitates were dried again to produce a polyacrylic acid powder cross-linked by Zn ions and containing the carbon fiber in a yield of 27 grams.

The mixing ratios of the raw materials employed in the above-described reaction were, for instance, 0.22 equivalents of polyacrylic acid, 0.26 equivalents of NaOH, and 0.67 equivalents of $ZnCl_2$. Hence, NaOH and $ZnCl_2$ were mixed in excess with respect to polyacrylic acid.

Since the polymer powder was aggregated partly during the drying, it was pulverized with a mortar to make a molding powder. A mold was prepared which had a cavity in a size of 10 mm×80 mm×3 mm, and 4.7 grams of the molding powder was charged into the cavity. The mold was decompressed in a vacuum chamber, and it was heated to and held at 250° C. Then, the mold was subjected to a pressure of 8,000 $kgf/cm^2$ for 60 minutes so as to carry out a vacuum hot compression molding.

After cooling the mold to room temperature, a plate-shaped molded body (#4) was ejected and taken out. The molded body (#4) included the chopped carbon fiber in an amount of 20% by volume, and it had a specific gravity of 1.95. The molded body (#4) was observed with an optical microscope, and it was found that the carbon fiber was dispersed substantially uniformly therein and defects such as voids, or the like, hardly arose therein, though part of the carbon fiber appeared to be broken. Table 1 below recites the specifications of the resulting polymer powder and the molded body (#4).

Second Preferred Embodiments

Polyacrylic acid powders cross-linked by Zn ions and containing the carbon fiber were prepared in the same manner as that of the First Preferred Embodiment except that the chopped carbon fiber amounts were changed variously in the dispersions. Likewise, the polyacrylic acid powders were molded into 5 molded bodies (#1, #2, #3, #5 and #6) including the carbon fiber in an amount of 5%, 10%, 15%, 25% and 30% by volume, respectively. Table 1 below also recites the specifications of the resulting polymer powders and the molded bodies (#1, #2, #3, #5 and #6).

Third Preferred Embodiments

Polyacrylic acid powders cross-linked by Zn ions and containing various reinforcing materials were prepared in the same manner as that of the First Preferred Embodiment except that the chopped carbon fiber was replaced by chopped aramid fiber, SiC whisker and alumina particle, respectively. The chopped aramid fiber was "TECNOLA" made by TEIJIN Co., Ltd., and it had a diameter of 12 micrometers, an average length of 1 mm and a specific gravity of 1.38. The SiC whisker was "TOKA WHISKER" made by TOKAI CARBON Co., Ltd., and it had a diameter of 1.2 micrometers, an average length of 40 micrometers and a specific gravity of 3.2. The alumina particle had an average particle diameter of 0.3 micrometers and a specific gravity of 3.97. Likewise, the polyacrylic acid powders were molded into 3 molded bodies (#7 through #9) including the reinforcing materials in an amount of 20% by volume, respectively. Table 1 below also recites the specifications of the resulting polymer powders and the molded bodies (#7 through #9).

Comparative Examples

A polyacrylic acid powder cross-linked by Zn ions was prepared in the same manner as that of the First Preferred Embodiment except that no chopped carbon fiber was added to the dispersion. Then, 22 grams of the resulting polymer powder was simply pulverized with a ball mill without adding the chopped carbon fiber thereto. Further, 1 gram, 2.2 grams and 5 grams of chopped carbon fiber were added to 22 grams each of the resulting polymer powder, and the mixed powders were pulverized and blended with the ball mill, respectively. 4 molding powders were thus prepared. 4 molded bodies (#10 through #13) were molded with 4.7 grams each of the molding powders in the same manner as that of the First Preferred Embodiment. Table 1 below also recites the specifications of the resulting polymer powders and the molded bodies (#10 through #13). However, it was hard to carry out the molding operation with the molding powder (#13) including the carbon fiber in an amount of 5 grams.

TABLE 1

| Identification | | Reinforcing Material & Addition Amount | Powder Yield | Reinforcing Material, Vol. Content | Molded Body, Specific Gravity |
|---|---|---|---|---|---|
| #1 | 2nd Pref. Embodiment | Carbon Fiber 1 g | 23 g | 5% | 1.99 |
| #2 | 2nd Pref. Embodiment | Carbon Fiber 2.2 g | 24.5 g | 10% | 1.98 |
| #3 | 2nd Pref. Embodiment | Carbon Fiber 3.5 g | 25.5 g | 15% | 1.96 |
| #4 | 1st Pref. Embodiment | Carbon Fiber 5 g | 27 g | 20% | 1.95 |
| #5 | 2nd Pref. Embodiment | Carbon Fiber 6.8 g | 29 g | 25% | 1.93 |
| #6 | 2nd Pref. Embodiment | Carbon Fiber 8.6 g | 30.5 g | 30% | 1.88 |
| #7 | 3rd Pref. Embodiment | Aramid Fiber 3.9 g | 26 g | 20% | 1.88 |
| #8 | 3rd Pref. Embodiment | SiC Whisker 9 g | 31 g | 20% | 2.23 |
| #9 | 3rd Pref. Embodiment | Alumina Particle 11.3 g | 33 g | 20% | 2.39 |
| #10 | Comp. Ex. | None | None | 0% | 2.00 |
| #11 | Comp. Ex. | Carbon Fiber 1 g | None | 5% | 1.89 |
| #12 | Comp. Ex. | Carbon Fiber 2.2 g | None | 10% | 1.79 |
| #13 | Comp. Ex. | Carbon Fiber 5 g | None | 20% | Hard to Mold |

Evaluation No. 1

Figure 4:
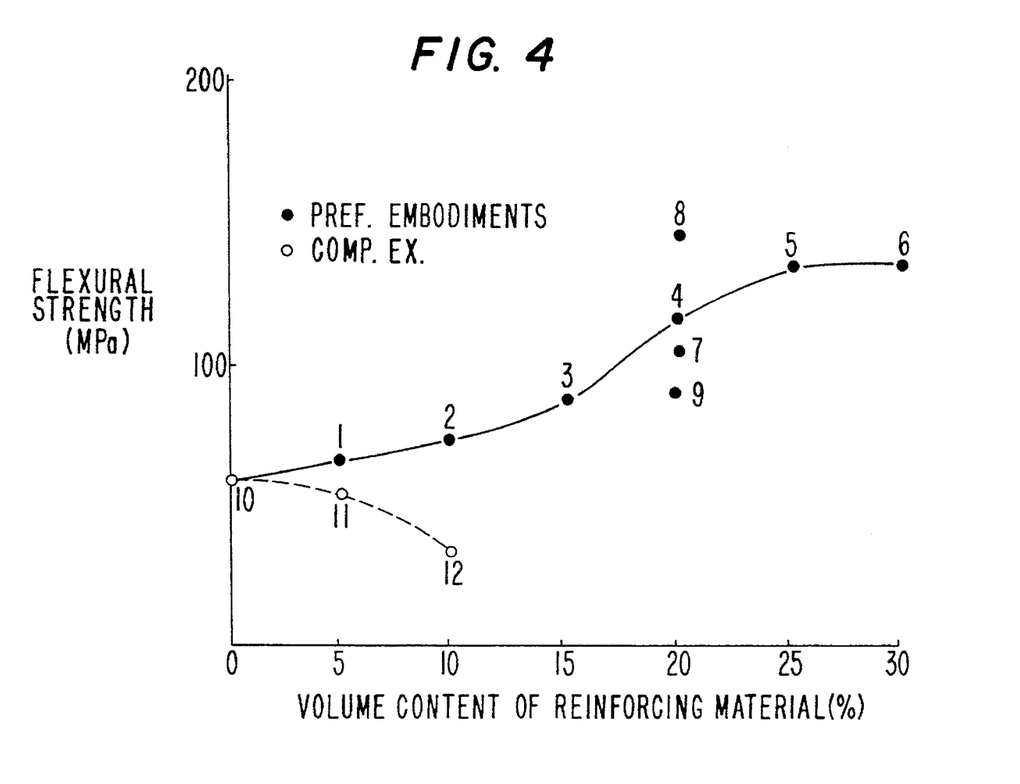
FIG. 4 is a line chart for illustrating the relationships between the reinforcing material contents and the 3-point flexural strengths exhibited by molded bodies formed of First through Third Preferred Embodiments of the present polymer powder and Comparative Examples.

The 13 molded bodies were examined for their 3-point flexural strengths at room temperature, respectively. The results of the examination are illustrated in FIG. 4. The molded bodies (#1 through #9) were formed of the polymer powders cross-linked by the metallic ions and containing the reinforcing materials which were prepared by the process for producing the polymer powder according to the present invention. As can be seen from FIG. 4, they were certainly improved in the strength by compounding the fibers, the whisker or particle with respect to the molded body (#10) of Comparative Examples free from the reinforcing materials, and the strengths were upgraded as the fiber contents increased.

On the other hand, the molded bodies (#11 and #12) of Comparative Examples were formed of the molding powders which were prepared by simply mixing the polymer powders cross-linked by the metallic ions with the carbon fiber. The strengths of the molded bodies (#11 and #12) were degraded as the fiber contents increased, and it was hard to mold with the molding powder including the fiber in amount of 20% by volume. Accordingly, it is apparent that there arose voids increasingly in the molded bodies formed of the molding powders which were prepared by cold blending.

Contrary to the molding powders for Comparative Examples, it was possible to mold with the molding powders, i.e., the polyacrylic acid polymer powders cross-linked by Zn ions and containing the carbon fiber, for the First and Second Preferred Embodiments even when they included the carbon fiber in an amount of 30% or more. Hence, it is understood that the reinforcing material can be dispersed extremely uniformly in the polymer powder by the present process for producing the polymer powder.

Fourth Preferred Embodiment

A polyacrylic acid powder cross-linked by Zn ions and containing carbon fiber was prepared in the same manner as that of the First Preferred Embodiment except that the chopped carbon fiber was added to the dispersion in an amount of 13 grams. The polyacrylic acid powder was produced in a yield of 35 grams, and it included the carbon fiber in an amount of 40% by volume and had an average particle diameter of about 100 micrometers. The synthesis of the polyacrylic acid powder was carried out repeatedly in order to produce the same powder in a large amount. Table 2 below recites the specifications of the resulting polymer powder.

Fifth Preferred Embodiment

Polyacrylic acid powders cross-linked by Zn ions and containing various reinforcing materials were prepared in the same manner as that of the Fourth Preferred Embodiment except that the chopped carbon fiber were replaced by chopped aramid fiber, SiC whisker, potassium titanate whisker, carbon black particle and Pb particle, respectively. The chopped aramid fiber was "TECNOLA" made by TEIJIN Co., Ltd., and it had a diameter of 12 micrometers, an average length of 1 mm and a specific gravity of 1.38. The SiC whisker was "TOKA WHISKER" made by TOKAI CARBON Co., Ltd., and it had a diameter of 1.2 micrometers, an average length of 40 micrometers and a specific gravity of 3.2. The potassium titanate whisker was "TISMO-D" made by OHTSUKA KAGAKU KOGYO Co., Ltd., and it had a diameter of 0.4 micrometers, an average length of 20 micrometers and a specific gravity of 3.2. The carbon black particle was natural graphite, and it had an average particle diameter of 17 micrometers and a specific gravity of 2.3. The Pb particle had an average particle diameter of 30 micrometers and a specific gravity of 11.3. The polyacrylic acid powders were produced in a large amount, respectively.

Table 2 below also recites the specifications of the resulting polymer powders.

TABLE 2

| Identification | | Reinforcing Material & Addition Amount | Powder Yield | Reinforcing Material, Vol. Content | Diameter of Polymer Powder |
| --- | --- | --- | --- | --- | --- |
| "a" | 4th Pref. Embodiment | Carbon Fiber 13 g | 35 g | 40% | Approx. 100 micrometers |
| "b" | 5th Pref. Embodiment | Aramid Fiber 10 g | 32 g | 40% | Approx. 100 micrometers |
| "c" | 5th Pref. Embodiment | SiC Whisker 23 g | 45 g | 40% | Approx. 100 micrometers |
| "d" | 5th Pref. Embodiment | Potassium Titanate Whisker 24 g | 46 g | 40% | Approx. 100 micrometers |
| "e" | 5th Pref. Embodiment | Carbon Black Particle 17 g | 39 g | 40% | Approx. 100 micrometers |
| "f" | 5th Pref. Embodiment | Pb Particle 83 g | 105 g | 40% | Approx. 100 micrometers |

Modified Version No. 1

3 kg of polymer powder "a" produced as set forth in the "Fourth Preferred Embodiment" section was added to and mixed with 3.17 kg of a molten polycarbonate resin which was heated to 340° C., thereby preparing a molding material. The molding material was charged into an injection molding machine to form a molded body. The molded body included the polymer powder "a" in an amount of 40% by volume, and accordingly it included the carbon fiber in an amount of 16% by volume.

The molded body was examined for the physical properties, and it was found that it maintained the high impact strength, one of the features of polycarbonate resin, and that it was improved remarkably in the strength and the heat resistance.

In addition, polymer powder "b" substituted for polymer powder "a," and it was added to and mixed with the molten polycarbonate resin in the same volume content in order to form a molded body. This latter molded body was appreciated to similarly produce the advantageous effects produced by the former molded body.

Modified Version No. 2

3 kg of polymer powder "c" produced as set forth in the "Fifth Preferred Embodiment" section was added to and mixed with 3.5 kg of a molten polyacetal resin which was heated to 230° C., thereby preparing a molding material. The molding material was charged into an injection molding machine to form a molded body. The molded body included the polymer powder "c" in an amount of 40% by volume, and accordingly it included the SiC whisker in an amount of 16% by volume.

The molded body was examined for the physical properties, and it was found that it was improved remarkably in the wear resistance, and that it was upgraded sharply in the strength and the heat resistance as well.

In addition, polymer powder "d" substituted for polymer powder "c," and it was added to and mixed with the molten polyacetal resin in the same volume content in order to form a molded body. This latter molded body was appreciated to similarly produce the advantageous effects produced by the former molded body.

Modified Version No. 3

6.8 grams of polymer powder "e" produced as set forth in the "Fifth Preferred Embodiment" section was mixed with 35 grams of a first grade white metal (as per "Japanese Industrial Standard") for a bearing alloy. The white metal included Sb in an amount of 6% by weight, Cu in an amount of 4% by weight and the balance of Sn, and it had an average particle diameter of 50 micrometers. The mixed powder was charged into a mold. After evacuating the mold, it was heated to and held at 220° C., and it was subjected to a pressure of 1,500 kgf/cm$^2$ for 30 minutes so as to carry out a vacuum hot compression molding. In the resulting molded body, the white metal powder was sintered satisfactorily, and polymer powder "e" was dispersed uniformly. The molded body included the polymer powder "e" in an amount of 40% by volume, and accordingly it included the carbon black particle in an amount of 16% by volume.

The molded body was examined for the physical properties, and it was found that it exhibited a sharply reduced friction coefficient with respect to that of a molded body made from the simple white metal, and that it was improved remarkably in the wear resistance.

In addition, polymer powder "f" substituted for polymer powder "e," and it was mixed with the white metal in the same volume content in order to form a molded body. This latter molded body was appreciated to similarly produce the advantageous effects produced by the former molded body.

Sixth Preferred Embodiment 1,700 c.c. of an aqueous solution including polyacrylic acid was prepared, and it included polyacrylic acid having a number average molecular weight of 250,000 in an amount of 15.7 grams. 550 c.c. of another aqueous solution including NaOH was prepared, and it included NaOH in an amount of 10 grams. Then, the aqueous solutions were charged into a beaker made from polyethylene, and $Si_3N_4$ whisker was charged into the mixed solution in an amount of 12 grams little by little while stirring the mixed solution. The stirring operation was continued until the $Si_3N_4$ whisker was fully opened and dispersed in the mixed solution, thereby obtaining a dispersion. The $Si_3N_4$ whisker was "SN-WB" made by UBE KOBAN Co., Ltd., and it had a diameter of 0.5 micrometers, an average length of 40 micrometers and a specific gravity of 3.18.

Thereafter, 1,300 c.c. of an aqueous solution including $ZnCl_2$ in an amount of 45 grams was dripped gradually into the dispersion while keeping the stirring operation. Thus, the polyacrylic acid was reacted with $ZnCl_2$. Even after the whole $ZnCl_2$ aqueous solution was dripped, the stirring operation was kept for about another 10 minutes to complete the reaction. With the extra stirring operation, the reaction products were precipitated while they were capturing the $Si_3N_4$ whisker. When the stirring was terminated, the precipitates were produced in the beaker at the lower portion, and the supernatant liquid was colorless and transparent.

The precipitates were filtered and dried. Then, the precipitates were filtered with pure water repeatedly, and thereby they were fully washed. The precipitates were dried again to produce a polyacrylic acid powder cross-linked by Zn ions and containing the $Si_3N_4$ whisker in a yield of 35 grams.

The mixing ratios of the raw materials employed in the above-described reaction were, for instance, 0.22 equivalents of polyacrylic acid, 0.26 equivalents of NaOH, and 0.67 equivalents of $ZnCl_2$. Hence, NaOH and $ZnCl_2$ were mixed in excess with respect to polyacrylic acid.

Since the polymer powder was aggregated partly during the drying, it was pulverized with a mortar to make a molding powder. The resulting polymer powder was a composite powder in which the $Si_3N_4$ whisker was dispersed uniformly in an amount of 25% by volume in the matrix including the polyacrylic acid cross-linked by Zn ions.

A mold was prepared which had a cavity in a size of 10 mm×80 mm×60 mm-depth, and 5.5 grams of the molding powder was charged into the cavity. The mold was decompressed in a vacuum chamber, and it was heated to and held at 300° C. Then, the mold was subjected to a pressure of 8,000 kgf/cm$^2$ for 60 minutes so as to carry out a vacuum hot compression molding.

After cooling the mold to room temperature, a plate-shaped molded body (#18) was ejected and taken out. The molded body (#18) included the $Si_3N_4$ whisker in an amount of 25% by volume, and it had a specific gravity of 2.29 and a thickness of about 3 mm. The molded body (#18) was observed with an optical microscope, and it was found that the $Si_3N_4$ whisker was dispersed fully uniformly therein and defects such as voids, or the like, hardly arose therein. Table 3 below recites the specifications of the resulting composite powder and the molded body (#18).

Seventh Preferred Embodiments

Polyacrylic acid powders cross-linked by Zn ions and containing the $Si_3N_4$ whisker in various amounts were prepared in the same manner as that of the Sixth Preferred Embodiment except that the $Si_3N_4$ contents were changed variously therein. Likewise, the polyacrylic acid powders were molded into 9 molded bodies (#14 through #17 and #19 through #23). Table 3 below also recites the specifications of the resulting composite powders and the molded bodies (#14 through #17 and #19 through #23). In the molding operations, the composite powders were charged into the mold in various amounts according to the $Si_3N_4$ whisker contents in order to uniformly arrange the thicknesses of the molded bodies to about 3 mm, because the specific gravities of the composite powders depend on the $Si_3N_4$ whisker contents.

According to the observation with an optical microscope, the $Si_3N_4$ whiskers were dispersed substantially uniformly in the molded bodies (#14 through #17 and #19 through #23), and defects such as voids, or the like, hardly arose therein. However, voids were seen scattered in the molded body (#22), and a large number of voids were found in the molded body (#23).

TABLE 3

| Identification | During Composite Powder Preparation | | During Molding | Molded Body | |
|---|---|---|---|---|---|
| | Whisker Content | Composite Powder Yield | Charging Amount | Whisker Content | Specific Gravity |
| #14 | 1.9 g | 24.5 g | 4.95 g | 5 vol. % | 2.06 |
| #15 | 4.0 g | 26.4 g | 5.10 g | 10 vol. % | 2.12 |
| #16 | 6.3 g | 28.5 g | 5.20 g | 15 vol. % | 2.18 |
| #17 | 9.0 g | 31.5 g | 5.37 g | 20 vol. % | 2.24 |
| #18 | 12.0 g | 35.0 g | 5.50 g | 25 vol. % | 2.29 |
| #19 | 15.4 g | 37.0 g | 5.65 g | 30 vol. % | 2.35 |

TABLE 3-continued

| Identification | During Composite Powder Preparation | | During Molding | Molded Body | |
|---|---|---|---|---|---|
| | Whisker Content | Composite Powder Yield | Charging Amount | Whisker Content | Specific Gravity |
| #20 | 24.0 g | 46.0 g | 5.95 g | 40 vol. % | 2.46 |
| #21 | 35.9 g | 58.0 g | 6.22 g | 50 vol. % | 2.59 |
| #22 | 53.9 g | 76.3 g | 6.50 g | 60 vol. % | 2.68 |
| #23 | 83.8 g | 105.6 g | 6.78 g | 70 vol. % | 2.75 |

Eighth Preferred Embodiments

Composite powders containing various reinforcing materials in an amount of 25% by volume were prepared in the same manner as that of the Sixth Preferred Embodiment except that the $Si_3N_4$ whisker was replaced by SiC whisker, aluminum borate whisker, potassium titanate whisker and zinc oxide whisker, respectively. The SiC whisker was "TWS-400" made by TOKAI CARBON Co., Ltd., and it had a diameter of 1 micrometer, an average length of 30 micrometers and a specific gravity of 3.18. The aluminum borate was "ALBOREX-G" made by SHIKOKU KASEI KOGYO Co., Ltd., and it had a diameter of 0.8 micrometers, an average length of 20 micrometers and a specific gravity of 2.93. The potassium titanate whisker was "TISMO-D" made by OHTSUKA KAGAKU KOGYO Co., Ltd., and it had a diameter of 0.4 micrometers, an average length of 15 micrometers and a specific gravity of 3.3. The zinc oxide whisker was "PANATETRA" made by MATSUSHITA SANGYO KIKI Co., Ltd., and it had a diameter of 1 micrometer, an average length of 70 micrometers and a specific gravity of 5.78. Likewise, the composite powders were molded into 4 molded bodies (#24 through #27). Table 4 below recites the specifications of the resulting composite powders and the molded bodies (#24 through #27). In the molding operations, the composite powders were charged into the mold in various amounts according to the whisker components in order to uniformly arrange the thicknesses of the molded bodies to about 3 mm, because the specific gravities of the composite powders depend on the whisker components.

According to the observation with an optical microscope, the whiskers were dispersed substantially uniformly in the molded bodies (#24 through #27), and defects such as voids, or the like, hardly arose therein.

In addition to the aforementioned whiskers, the present invention can employ graphite whisker, alpha-alumina whisker, magnesia whisker, or the like.

TABLE 4

| Identification | During Composite Powder Preparation | | During Molding | Molded Body | |
|---|---|---|---|---|---|
| | Whisker Component (Content) | Composite Powder Yield | Charging Amount | Whisker Content | Specific Gravity |
| #24 | SiC (12 g) | 34.5 g | 5.5 g | 25 vol. % | 2.29 |
| #25 | Aluminum Borate (11 g) | 33.5 g | 5.35 g | 25 vol. % | 2.23 |
| #26 | Potassium Titanate (12.4 g) | 35 g | 5.6 g | 25 vol. % | 2.33 |
| #27 | Zinc Oxide (21.8 g) | 44 g | 7.1 g | 25 vol. % | 2.94 |

Ninth Preferred Embodiments

Polyacrylic acid composite powders cross-linked by metallic ions and containing the $Si_3N_4$ were prepared in the same manner as that of the Sixth Preferred Embodiment except that $ZnCl_2$, i.e., the metallic salt, was replaced by $NiCl_2$, $CoCl_2$, $AlCl_3$ and $CrCl_3$ during the synthesis of the composite powders. Likewise, the polyacrylic acid composite powders cross-linked by the metallic ions were molded into 4 molded bodies (#28 through #31). Table 5 below recites the specifications of the resulting composite powders and the molded bodies (#28 through #31).

In the synthesis of the composite powders, the chlorides of the metals were mixed in good excess with respect to the equivalents of the polyacrylic acid. The chlorides were added in the form of their hydrates, but their addition amounts, i.e., the contents set forth in Table 5 below, were equal to the weights of the chlorides themselves free from water.

According to the observation with an optical microscope, the $Si_3N_4$ whisker was dispersed substantially uniformly in the molded bodies (#28 through #31), and defects such as voids, or the like, hardly arose therein.

TABLE 5

| Identification | During Composite Powder Preparation | | During Molding | Molded Body | |
|---|---|---|---|---|---|
| | Chloride Component (Content) | Composite Powder Yield | Charging Amount | Whisker Content | Specific Gravity |
| #28 | $NiCl_2$ (43 g) | 34 g | 5.4 g | 25 vol. % | 2.25 |
| #29 | $CoCl_2$ (43 g) | 34 g | 5.4 g | 25 vol. % | 2.26 |
| #30 | $AlCl_3$ (45 g) | 32 g | 5.2 g | 25 vol. % | 2.16 |
| #31 | $CrCl_3$ (53 g) | 35 g | 5.5 g | 25 vol. % | 2.35 |

Tenth Preferred Embodiments

Composite powders cross-linked by metallic ions and containing whiskers in various amounts were prepared in the same manner as that of the Sixth Preferred Embodiment except that 19.2 grams of polymethacrylic acid substituted for the polyacrylic acid, and that the components of the metallic salt and the whisker were varied as set forth in Table 6 during the synthesis of the composite powders. Likewise, the composite powders were molded into 5 molded bodies (#32 through #36). Table 6 below recites the specifications of the resulting composite powders and the molded bodies (#32 through #36). The polymethacrylic acid had a number average molecular weight of 80,000.

According to the observation with an optical microscope, the whiskers were dispersed substantially uniformly in the molded bodies (#32 through #36), and defects such as voids, or the like, hardly arose therein.

TABLE 6

| Identification | During Composite Powder Preparation | | During Molding | Molded Body | |
|---|---|---|---|---|---|
| | Whisker Component | Chloride Component | Chloride Content | Whisker Content | Specific Gravity |
| #32 | $Si_3N_4$ | $ZnCl_2$ | 45 g | 25 vol. % | 2.24 |
| #33 | $Si_3N_4$ | $ZnCl_2$ | 45 g | 40 vol. % | 2.42 |
| #34 | SiC | $CoCl_2$ | 43 g | 25 vol. % | 2.22 |
| #35 | Aluminum Borate | $AlCl_3$ | 45 g | 30 vol. % | 2.05 |
| #36 | Potassium Titanate | $CrCl_3$ | 53 g | 40 vol. % | 2.39 |

Comparative Examples

A polyacrylic acid powder cross-linked by Zn ions but free from the $Si_3N_4$ whisker was prepared in the same manner as that of the Sixth Preferred Embodiment except that no $Si_3N_4$ whisker was employed. Then, the resulting polymer powder was pulverized and blended with 4 different amounts of the $Si_3N_4$ whisker with a ball mill, thereby preparing 4 composite powders. The resulting 4 composite powders were molded into 4 molded bodies (#37 through #40) in the same manner as that of the Sixth Preferred Embodiment. The molded bodies (#37 through #40) were prepared so as to include the $Si_3N_4$ whisker in an amount of 0, 3, 5 and 10% by volume, respectively.

Further, polyacrylic acid powders cross-linked by metallic ions but free from the $Si_3N_4$ whisker were prepared by using the various metallic salts in the same manner as that of the Ninth Preferred Embodiment except that no $Si_3N_4$ whisker was employed. Then, the resulting polymer powders were molded into 4 molded bodies (#41 through #44) similarly.

Furthermore, polymethacrylic acid powders cross-linked by metallic ions but free from the whiskers were prepared in the same manner as that of the Tenth Preferred Embodiment except that no whiskers were employed. Then, the resulting polymer powders were molded into a molded bodies (#45 through #48) similarly. Table 7 below recites the specifications of the resulting composite powders and the molded bodies (#37 through According to the observation with an optical microscope, the molded bodies free from the whiskers had favorable structures. However, the molded bodies (#38 through #40) were found that the whiskers were localized therein, and that the larger the whisker content was, the larger number of voids arose therein. In particular, the number of voids was considerably larger in the molded bodies (#38 through #40) than it was in the Sixth through Tenth Preferred Embodiments.

TABLE 7

| Identification | During Composite Powder Preparation | | Molded Body | | |
|---|---|---|---|---|---|
| | Polymer Component | Chloride Component | Whisker Component | Whisker Content | Specific Gravity |
| #37 | Polyacrylic Acid | $ZnCl_2$ | None | None | 2.01 |
| #38 | Polyacrylic Acid | $ZnCl_2$ | $Si_3N_4$ | 3 vol. % | 2.01 |
| #39 | Polyacrylic Acid | $ZnCl_2$ | $Si_3N_4$ | 5 vol. % | 1.99 |
| #40 | Polyacrylic Acid | $ZnCl_2$ | $Si_3N_4$ | 10 vol. % | 2.01 |
| #41 | Polyacrylic Acid | $NiCl_2$ | None | None | 1.96 |
| #42 | Polyacrylic Acid | $CoCl_2$ | None | None | 1.95 |
| #43 | Polyacrylic Acid | $AlCl_3$ | None | None | 1.81 |
| #44 | Polyacrylic Acid | $CrCl_3$ | None | None | 2.05 |
| #45 | Polymethacrylic Acid | $ZnCl_2$ | None | None | 1.91 |
| #46 | Polymethacrylic Acid | $CoCl_2$ | None | None | 1.86 |
| #47 | Polymethacrylic Acid | $AlCl_3$ | None | None | 1.73 |
| #48 | Polymethacrylic Acid | $CrCl_3$ | None | None | 1.95 |

Evaluation No. 2

Figure 6:
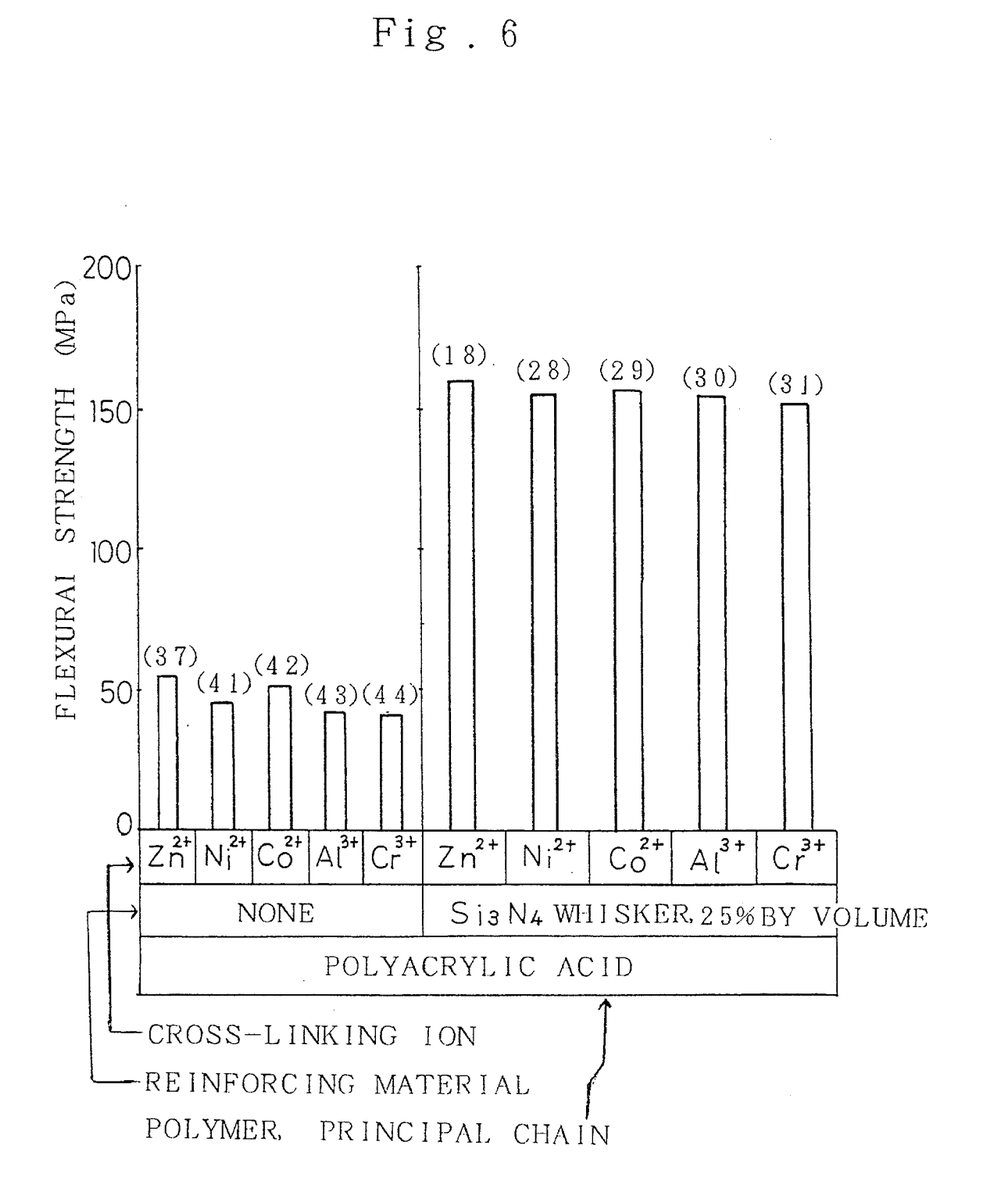
FIG. 6 is a bar chart for illustrating the 3-point bending strengths exhibited by Sixth and Ninth Preferred Embodiments of the present composite material and Comparative Examples which were based on polyacrylic acid, but in which the metallic ions were varied.
Figure 7:
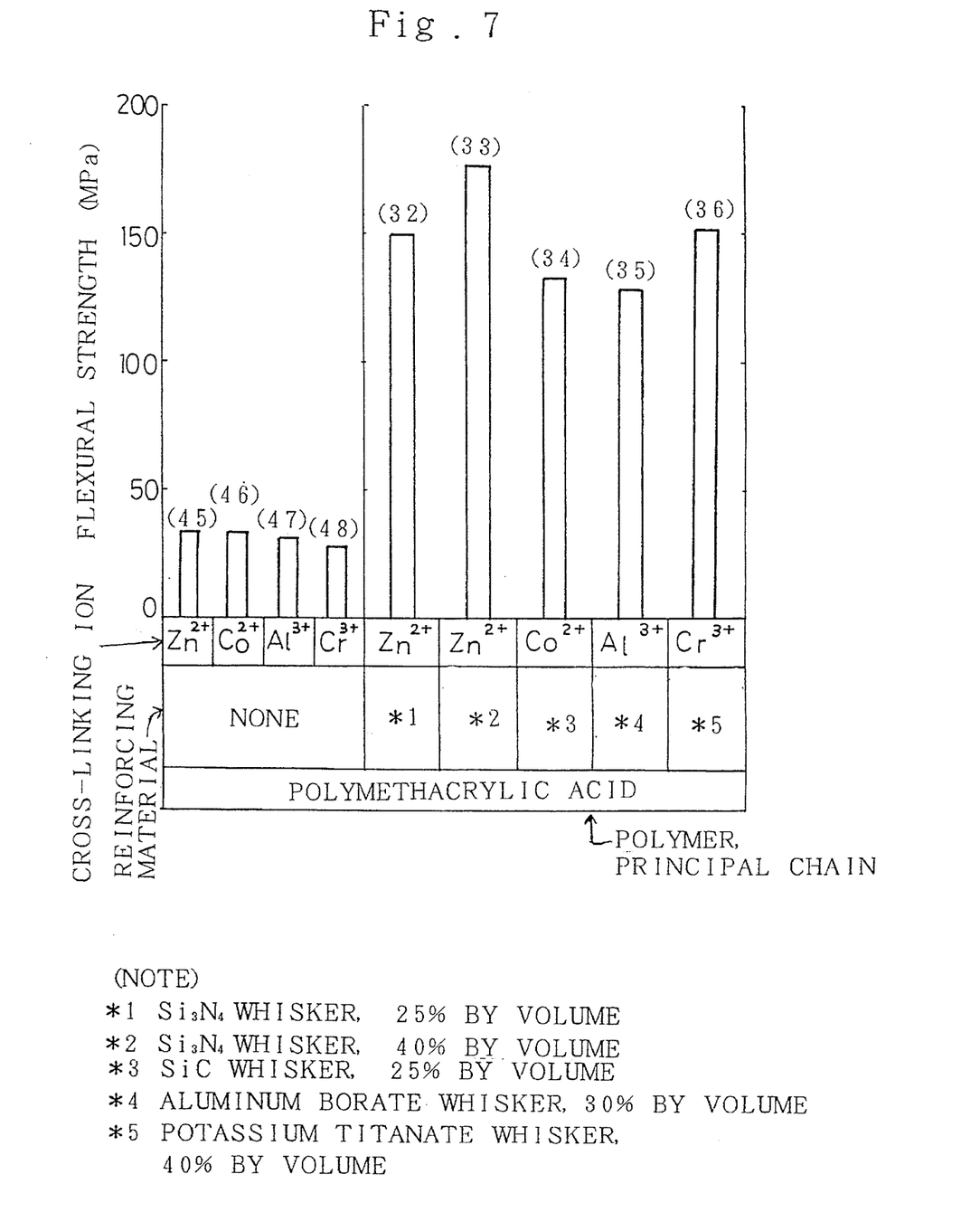
FIG. 7 is a bar chart for illustrating the 3-point bending strengths exhibited by Tenth Preferred Embodiments of the present composite material and Comparative Examples which were based on polymethacrylic acid, but in which the metallic ions and the reinforcing material were varied.

The 23 molded bodies (#14 through #36) of the Sixth through Tenth Preferred Embodiments and the 12 molded bodies (#37 through #48) of the Comparative Examples were examined for their 3-point flexural strengths at room temperature, respectively. The results of the examination are illustrated in FIGS. 5 through 7.

Figure 5:
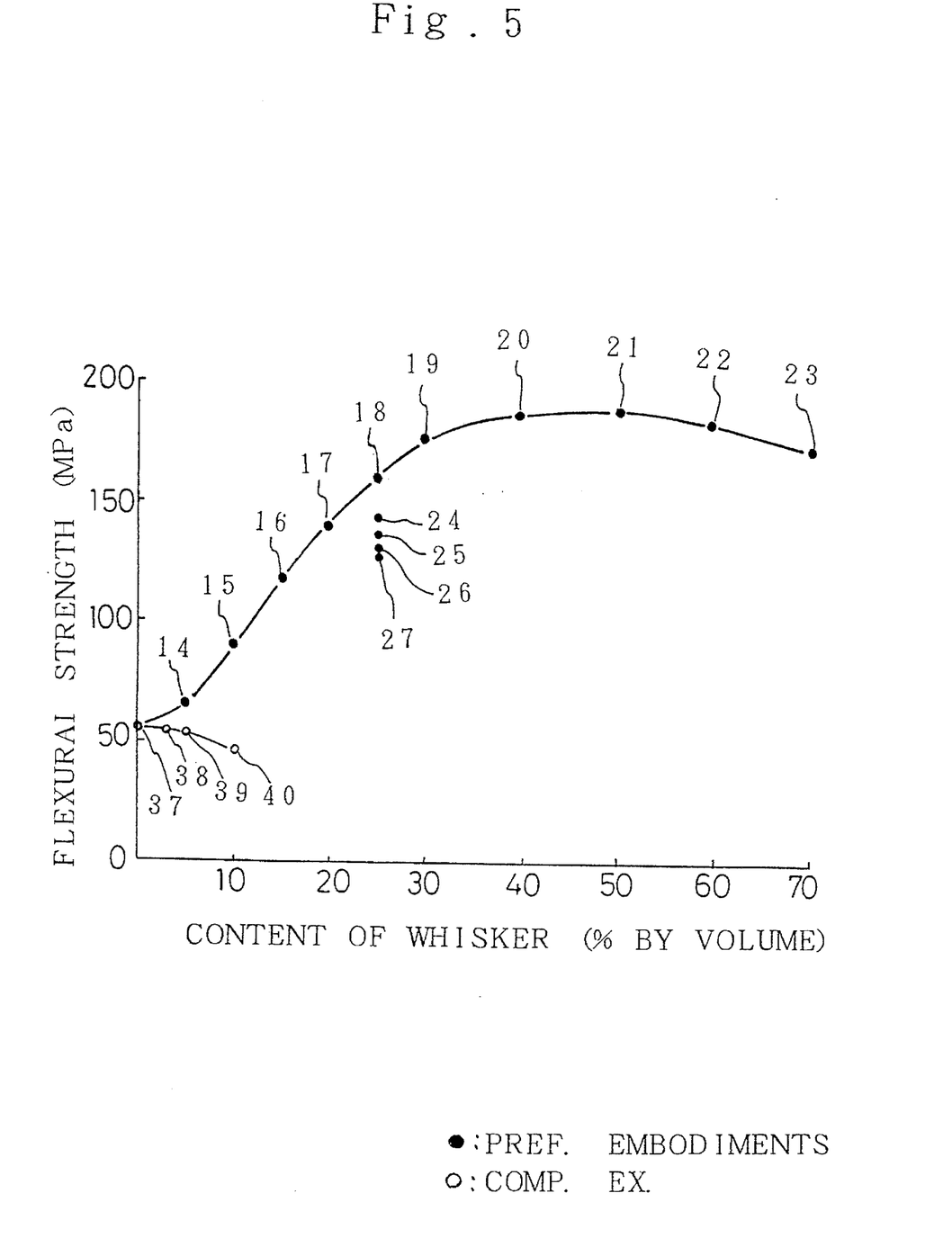
FIG. 5 is a line chart for illustrating the relationships between the whisker contents and the 3-point flexural strengths exhibited by molded bodies or Sixth through Eighth Preferred Embodiments of the present composite material and Comparative Examples.

FIG. 5 illustrates the results of the examination to which the molded bodies (#14 through #27) of the Sixth through Eighth Preferred Embodiments and the molded bodies (#37 through #40) of the Comparative Examples were subjected. It is apparent that the molded bodies (#14 through #23) of the Preferred Embodiments in which the $Si_3N_4$ whisker was dispersed uniformly were improved in the strength securely compared to the molded body (#37) of the Comparative Examples free from the $Si_3N_4$ whisker, and that the strengths were upgraded sharply as the whisker contents increased. However, according to the composition of the molded bodies (#14 through #23), i.e., the polyacrylic acid polymer cross-linked by Zn ions and containing the $Si_3N_4$ whisker, there arise the maximum strength at around a whisker content of from 40 to 50% by volume, and thereafter the strength seems to decrease gradually.

On the other hand, the molded bodies (#38 through #40) of the Comparative Examples in which the $Si_3N_4$ whisker was blended simply exhibited the deteriorated strengths compared to that of the polymer itself. The strengths were degraded as the whisker contents increased. The degraded strengths are believed to result from the localized whiskers, and this sort of phenomenon is not expected in the ordinary thermoplastic or thermosetting resins in which the whisker is blended simply.

The results of the examination described so far are on the molded bodies made from the polyacrylic acid composite powder cross-linked by Zn ions and containing the $Si_3N_4$ whisker. It is reasonable to expect from the results exhibited by the molded bodies (#24 through #27) that the molded bodies can be upgraded remarkably in the strengths by uniformly dispersing the other whiskers therein.

FIG. 6 illustrates the results of the examination to which the molded bodies (#18, and #28 through #31) of the Sixth and Ninth Preferred Embodiments and the molded bodies (#37, and #41 through #44) of the Comparative Examples were subjected. FIG. 6 suggests that there were hardly any differences between the strengths exhibited by the molded bodies which were made from the polyacrylic acid composite powders cross-linked by the different metallic ions, and that, regardless of the metallic ions cross-linking the polymer, the molded bodies were improved remarkably in the strengths by compounding the whisker therein. Hence, it was found that the strengths of the molded bodies depend largely on how the whisker is compounded rather than what metallic ions cross-link the polymer.

FIG. 7 illustrates the results of the examination to which the molded bodies (#32 through #36) of the Tenth Preferred Embodiments and the molded bodies (#45 through #48) of the Comparative Examples were subjected. It can be seen from FIG. 7 that, regardless of the polymer raw material, e.g., polymethacrylic acid, the molded bodies were enhanced remarkably in the strengths by appropriately selecting the metallic ions and the whiskers and by compounding the whiskers uniformly therein.

In the case of the molded body made from a simple polymer free from the whiskers, it is understood by comparing FIG. 6 with FIG. 7 that the molded body (#37) made from polyacrylic acid exhibited a higher strength than the molded body (#45) made from polymethacrylic acid did. However, when the whiskers are compounded in the polymers, the strengths of the molded bodies seemed to depend greatly on the components of the whiskers and the contents thereof rather than the polymers. Hence, regardless of the polymer raw material, e.g., polyacrylic acid or polymethacrylic acid, the molded bodies exhibited strengths equivalent to each other.

Eleventh Preferred Embodiment 1,700 c.c. of an aqueous solution including polyacrylic acid was prepared, and it included polyacrylic acid having a number average molecular weight of 250,000 in an amount of 15.7 grams. 550 c.c. of another aqueous solution including NaOH was prepared, and it included NaOH in an amount of 10 grams. Then, the aqueous solutions were charged into a beaker made from polyethylene, and aramid fiber was charged into the mixed solution in an amount of 5.2 grams while stirring the mixed solution. The stirring operation was continued until the aramid fiber was fully opened and dispersed in the mixed solution, thereby obtaining a dispersion. The aramid fiber was milled fiber, "TECNOLA" made by TEIJIN Co., Ltd., and it had a diameter of 7 micrometers, an average length of 0.2 mm and a specific gravity of 1.38.

Thereafter, 1,300 c.c. of an aqueous solution including $ZnCl_2$ in an amount of 45 grams was dripped gradually into the dispersion while keeping the stirring operation. Thus, the polyacrylic acid was reacted with $ZnCl_2$. Here, the mixing ratios of the raw materials employed in the reaction were, for instance, 0.22 equivalents of polyacrylic acid, 0.26 equivalents of NaOH, and 0.67 equivalents of $Zncl_2$. Hence, NaOH and $ZnCl_2$ were mixed in excess with respect to polyacrylic acid. Even after the whole $ZnCl_2$ aqueous solution was dripped, the stirring operation was kept for about another 10 minutes to complete the reaction. With the extra stirring operation, the reaction products were precipitated while they were capturing the aramid fiber. When the stirring was terminated, the precipitates were produced in the beaker at the lower portion, and the supernatant liquid was colorless and transparent.

The precipitates were filtered and dried. Then, the precipitates were further filtered with pure water repeatedly to fully wash, and thereafter they were dried. Since the polymer powder was aggregated partly during the drying, it was pulverized with a mortar, thereby producing a composite powder in a yield of 28 grams. In the composite powder, the polyacrylic acid cross-linked by Zn ions was adapted to be the matrix, and the aramid fiber was adapted to be the reinforcing material and contained uniformly. The resulting composite powder included the matrix and the aramid fiber in a volume ratio of 3 to 1, and accordingly it was a composite material containing the aramid fiber in an amount of 25% by volume.

A mold was prepared which had a cavity in a size of 10 mm×80 mm×60 mm-depth, and 4.4 grams of the composite powder was charged into the cavity. The mold was decompressed in a vacuum chamber, and it was heated to and held at 250° C. Then, the mold was subjected to a pressure of 8,000 kgf/cm$^2$ for 60 minutes so as to carry out a vacuum hot compression molding.

After cooling the mold to room temperature, a plate-shaped molded body (#53) was ejected and taken out. The molded body (#53) included the aramid fiber in amount of 25% by volume, and it had a specific gravity of 1.83 and a thickness of about 3 mm. The molded body (#53) was observed with an optical microscope, and it was found that the aramid fiber was dispersed fully uniformly therein and defects such as voids, or the like, hardly arose therein. Table 8 below recites the specifications of the resulting composite powder and the molded body (#53).

Twelfth Preferred Embodiments

Polyacrylic acid powders cross-linked by Zn ions and containing the aramid fiber in various amounts were prepared in the same manner as that of the Eleventh Preferred Embodiment except that the aramid fiber contents were changed variously therein. Likewise, the polyacrylic acid powders were molded into 9 molded bodies (#49 through #52 and #54 through #58). Table 8 below also recites the specifications of the resulting composite powders and the molded bodies (#49 through #52 and 54 through #58). In the molding operations, the composite powders were charged into the mold in various amounts according to the aramid fiber contents in order to uniformly arrange the thicknesses of the molded bodies to about 3 mm, because the specific gravities of the composite powders depend on the aramid fiber contents.

According to the observation with an optical microscope, the aramid fibers were dispersed uniformly in the molded bodies (#49 through #52 and #54 through #58), and defects such as voids, or the like, hardly arose therein.

TABLE 8

| Iden-tification | During Composite Powder Preparation | | During Molding | Molded Body | |
|---|---|---|---|---|---|
| | Fiber Content | Powder Yield | Charging Amount | Fiber Content | Specific Gravity |
| #49 | 0.82 g | 23.4 g | 4.73 g | 5 vol. % | 1.97 |
| #50 | 1.74 g | 24.1 g | 4.65 g | 10 vol. % | 1.94 |
| #51 | 2.73 g | 24.9 g | 4.58 g | 15 vol. % | 1.91 |
| #52 | 3.91 g | 26.2 g | 4.50 g | 20 vol. % | 1.88 |
| #53 | 5.20 g | 28.0 g | 4.40 g | 25 vol. % | 1.83 |
| #54 | 6.68 g | 28.3 g | 4.35 g | 30 vol. % | 1.82 |
| #55 | 8.55 g | 31.0 g | 4.20 g | 40 vol. % | 1.75 |
| #56 | 10.40 g | 32.5 g | 4.06 g | 50 vol. % | 1.71 |
| #57 | 12.80 g | 35.4 g | 3.91 g | 60 vol. % | 1.63 |
| #58 | 15.60 g | 37.2 g | 3.76 g | 70 vol. % | 1.57 |

Thirteenth Preferred Embodiments

Polyacrylic acid composite powders cross-linked by metallic ions and containing the aramid fiber were prepared in the same manner as that of the Eleventh Preferred Embodiment except that $ZnCl_2$, i.e., the metallic salt, was replaced by $NiCl_2$, $CoCl_2$, $AlCl_3$ and $CrCl_3$, respectively, in the contents set forth in Table 9 below during the synthesis of the composite powders. Likewise, the polyacrylic acid composite powders cross-linked by the metallic ions were molded into 4 molded bodies (#59 through #62). Table 9 below recites the specifications of the resulting composite powders and the molded bodies (#59 through #62).

According to the observation with an optical microscope, the aramid fiber was dispersed uniformly in the molded bodies (#59 through #62), and defects such as voids, or the like, hardly arose therein.

TABLE 9

| Iden-tification | During Composite Powder Preparation | | During Molding | Molded Body | |
|---|---|---|---|---|---|
| | Chloride Component (Content) | Composite Powder Yield | Charging Amount | Fiber Content | Specific Gravity |
| #59 | $NiCl_2$ (43 g) | 27 g | 4.66 g | 25 vol. % | 1.94 |
| #60 | $CoCl_2$ (43 g) | 27 g | 4.68 g | 25 vol. % | 1.95 |
| #61 | $AlCl_3$ (45 g) | 25 g | 4.47 g | 25 vol. % | 1.86 |
| #62 | $CrCl_3$ (53 g) | 28 g | 4.85 g | 25 vol. % | 2.02 |

In the synthesis of the composite powders, the employed chlorides of the metals were mixed in good excess with respect to the equivalents of the polyacrylic acid. The chlorides were added in the form of their hydrates. For instance, $AlCl_3\text{-}6H_2O$ was added for $AlCl_3$, but the addition amount, i.e., the $AlCl_3$ content set forth in Table 9 above, was the weight of $AlCl_3$. Similarly, the other chlorides were also added in the form of their hydrates, and their addition amounts were the weights of the chloride themselves free from water.

Comparative Examples

A polyacrylic acid powder cross-linked by Zn ions but free from the aramid fiber was prepared in the same manner as that of the Eleventh Preferred Embodiment except that no aramid fiber was employed. Then, the polymer powder was pulverized with a ball mill, and it was molded into a molded body (#63) in the same manner as that of the Eleventh Preferred Embodiment. Further, the resulting polymer powder was pulverized and blended with the aramid fiber, which was identical with the one used in the Eleventh Preferred Embodiment, with a ball mill, thereby preparing a composite powder. Likewise, the composite powder was molded into another molded body (#64). The molded body (#64) was prepared so as to include the aramid fiber in an amount of 25% by volume. Table 10 below recites the specifications of the resulting composite powder and the molded bodies (#63 and #64).

According to the observation with an optical microscope, the molded bodies (#63 and #64) were found that no voids arose therein. However, in the molded bodies (#64), the aramid fiber was dispersed unevenly therein, and there existed the portions where only the aramid fiber was aggregated densely therein.

TABLE 10

| Iden-tification | During Composite Powder Preparation | | Molded Body | | |
|---|---|---|---|---|---|
| | Polymer Component | Chloride Component | Fiber Component | Fiber Content | Specific Gravity |
| #63 | Polyacrylic Acid | $ZnCl_2$ | None | None | 2.01 |
| #64 | Polyacrylic Acid | $ZnCl_2$ | Aramid Fiber | 25 vol. % | 1.84 |

Evaluation No. 3

Figure 8:
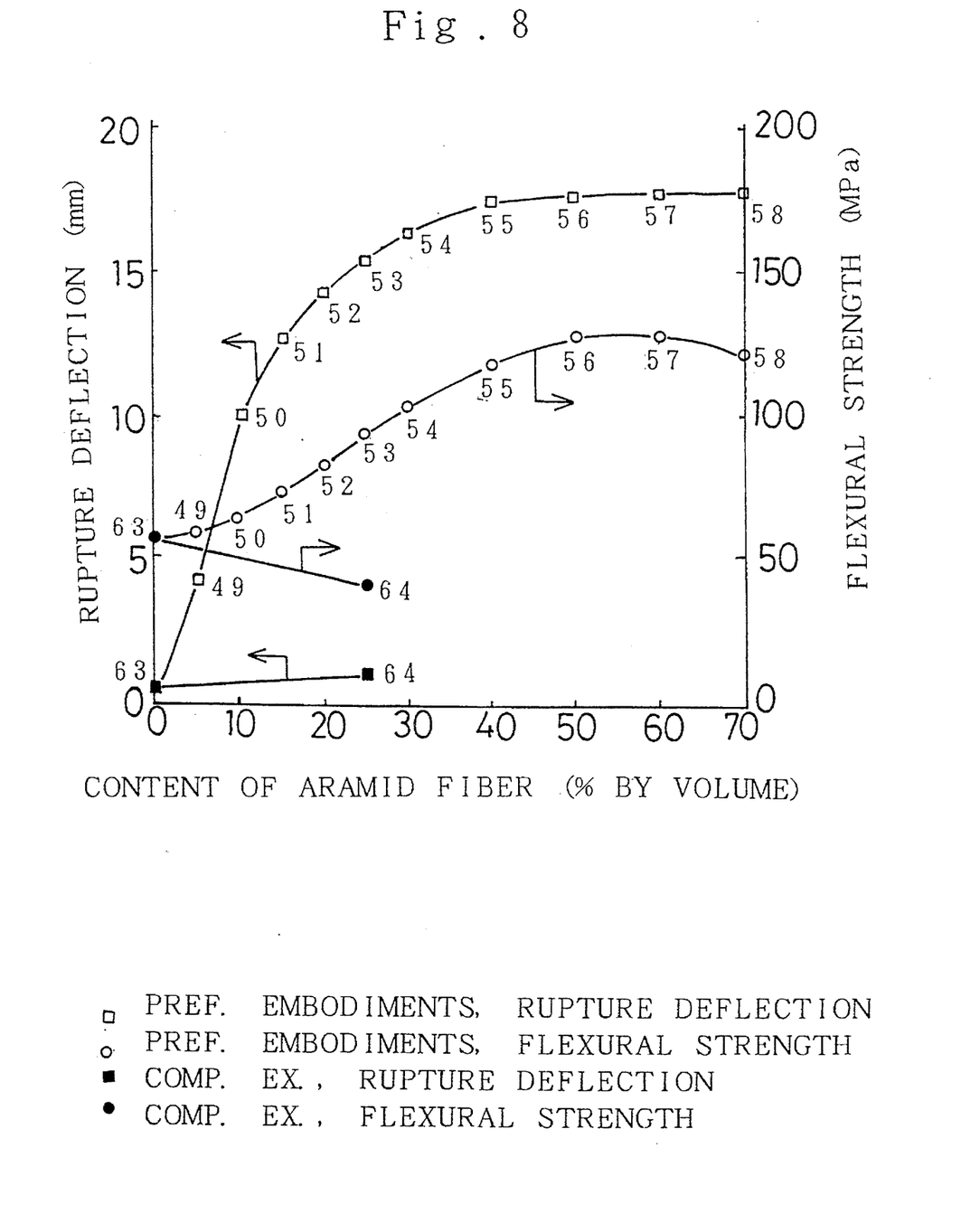
FIG. 8 is a line chart for illustrating the relationships between the aramid fiber contents, the rupture deflections and the 3-point flexural strengths exhibited by Eleventh and Twelfth Preferred Embodiments of the present composite material and Comparative Examples.
Figure 9:
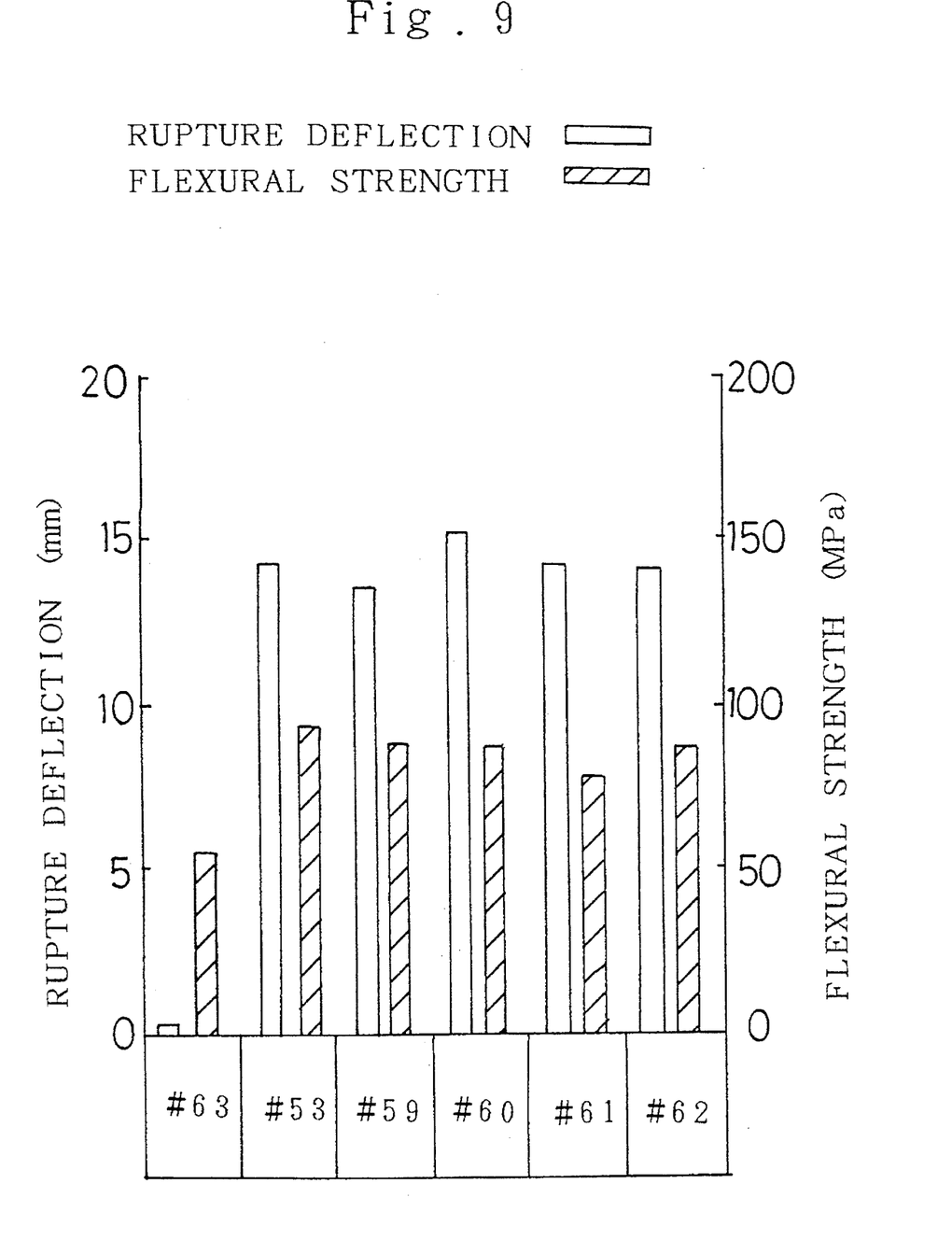
FIG. 9 is a bar chart for illustrating the rupture deflections and the 3-point flexural strengths exhibited by Eleventh and Thirteenth Preferred Embodiments of the present composite material, in which the aramid fiber content was fixed but the metallic ions were varied, and those exhibited by a Comparative Example free from the aramid fiber.

The 14 molded bodies (#49 through #62) of the Eleventh through Thirteenth Preferred Embodiments and the 2 molded bodies of the Comparative Examples were examined for their 3-point flexural strengths at room temperature, respectively. The results of the examination, e.g., the rupture deflections and the 3point flexural strengths, are illustrated in FIGS. 8 and 9. Here, the 3-point flexural strength test was carried out at a span of 40 mm.

It can be understood from FIG. 8 that the molded bodies (#49 through #58) with the aramid fiber compounded therein exhibited sharply increased rupture deflections with respect to a rupture deflection of 0.3 mm exhibited by the molded body (#63) of the Comparative Examples free from the aramid fiber. Thus, it is apparent that the molded bodies (#49 through #58) were improved in the flexibility by uniformly dispersing the aramid fiber, and that the uniformly dispersed aramid fiber was effective in upgrading the impact resistance of the molded bodies. For instance, by comparing the molded body (#53) of the Eleventh Preferred Embodiment with the molded body (#63) of the Comparative Examples, an un-notched test specimen made from the molded body (#53) exhibited an Izod impact value of about 10 kgf-cm/$cm^2$ which was about five times as high as 2 kgfcm/$cm^2$ exhibited by the test specimen made from the molded body (#63). Hence, it was verified that the Izod impact value can be upgraded by compounding the aramid fiber.

Further, it can be seen from FIG. 8 that a superb advantageous effects could be obtained even when the aramid fiber was compounded in an amount of 5% by volume. Namely, the molded body (#49) exhibited a rupture deflection of about 4 mm which was more than 10 times the rupture deflection exhibited by the molded body (#63) of the Comparative Examples. Obviously, the rupture deflections were increased as the aramid fiber contents increased. For example, the molded body (#53) including the aramid fiber in an amount of 25% by volume exhibited a rupture deflection of about 15 mm which was about 50 times as high as that of the molded body (#63) of the Comparative Examples.

Furthermore, the molded bodies (#49 through #62) made from the composite materials of the Eleventh through Thirteenth Preferred Embodiments were enhanced in the 3-point flexural strength. For instance, the molded body (#53) exhibited a 3-point flexural strength which was about 1.5 times as high as that of the molded body (#63) of the Comparative Examples.

Moreover, the molded body (#64) of the Comparative Examples was made from the conventional composite material in which the aramid fiber was blended mechanically. The molded body (#64) exhibited a slightly improved rupture deflection with respect to that of the molded body (#63), but it exhibited a 3-point flexural strength which was degraded by a factor of nearly 30%. The degradation is apparently resulted from the unevenly dispersed aramid fiber. Hence, in order to obtain the advantageous effects, it is extremely important to disperse the aramid fibers as uniformly as they were dispersed in the molded bodies (#49 through #52) of the Eleventh through Thirteenth Preferred Embodiments.

It is appreciated from FIG. 9 that, regardless of the metallic ions employed for cross-linking the polymer, the molded bodies (#53, and #59 through #62) of the Eleventh and Thirteenth Preferred Embodiments were enhanced in the rupture deflection remarkably and in the 3-point strength as well. Therefore, it was found that a wide variety of metallic ions other than Zn ions can be adapted to cross-link the polymer.

In addition, in the Eleventh through Thirteenth Preferred Embodiments, only the milled para-aramid fiber was used for the reinforcing material. However, it was possible to give high flexibilities to the molded bodies made from the composite materials which included meta-aramid fiber, whole aromatic polyester fiber, polyethylene fiber, nylon fiber, or the like, as the reinforcing material.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing a polymer powder cross-linked by metallic ions and containing reinforcing material, comprising the steps of:

a reinforcing material dispersion step comprising preparing a solution including a polymer raw material cross-linkable by reacting with metallic ions and another solution including the metallic ions, and dispersing a fibrous reinforcing material or a particulate reinforcing material in at least one of the solutions;

a reaction step comprising (i) mixing and reacting said solutions to form a polymer which is cross-linked with said metallic ions and captures said reinforcing material and (ii) precipitating the resulting polymer and captured reinforcing material; and a separation and desiccation step comprising separating the resulting precipitated polymer and captured reinforcing material from liquid and drying them.

2. A process for producing a composite material based on a polymer cross-linked by metallic ions, comprising the steps of:

a reinforcing material dispersion step comprising preparing a solution including a polymer raw material cross-linkable by reacting with metallic ions and another solution including the metallic ions, and dispersing a fibrous reinforcing material or a particulate reinforcing material in at least one of the solutions;

a reaction step comprising (i) mixing and reacting said solutions to form a polymer which is cross-linked with said metallic ions and captures said reinforcing material and (ii) precipitating the resulting polymer and captured reinforcing material;

a separation and desiccation step comprising separating the resulting precipitated polymer and captured reinforcing material from liquid and drying them, thereby making a polymer powder cross-linked by said metallic ions and containing said reinforcing material; and a formation step comprising heating, compressing and molding said polymer powder with a mold.

3. A composite material based on a polymer cross-linked by metallic ions, comprising:

a matrix including a polymer cross-linked by metallic ions; and a fine whisker reinforcing material dispersed uniformly in said matrix in an amount of from 5 to 70% by volume.

4. The composite material according to claim 3, wherein said whisker material is included in an amount of from 10 to 50% by volume.

5. The composite material according to claim 3, wherein said whisker material is included in an amount of 25% by volume or more.

\* \* \* \* \*